United States Patent [19]

ben-Aaron

[11] Patent Number: 4,749,933
[45] Date of Patent: Jun. 7, 1988

[54] POLYPHASE INDUCTION MOTOR SYSTEM AND OPERATING METHOD

[76] Inventor: Max ben-Aaron, 61 South Rd., Bedford, Mass. 01730

[21] Appl. No.: 833,982

[22] Filed: Feb. 26, 1986

[51] Int. Cl.$^4$ ............................................. H02P 5/40
[52] U.S. Cl. .................................... 318/810; 318/732; 310/201
[58] Field of Search ............... 318/810, 773, 774, 775, 318/776, 830, 831; 310/201

[56] References Cited

U.S. PATENT DOCUMENTS

| | | | |
|---|---|---|---|
| 1,183,548 | 5/1916 | Forbes | 310/201 |
| 2,695,369 | 11/1954 | Lloyd et al. | 310/87 |
| 3,175,143 | 3/1965 | Rawcliffe | 318/773 |
| 3,211,982 | 10/1965 | Neyhouse et al. | |
| 3,213,343 | 10/1965 | Sheheen | 318/341 |
| 3,252,027 | 5/1966 | Korinek | 310/201 |
| 3,445,742 | 5/1969 | Moscardi | |
| 3,603,866 | 9/1971 | Opal | 318/810 |
| 3,652,912 | 3/1972 | Bordonaro | 318/599 |
| 3,706,923 | 12/1972 | Dunfield | 318/254 |
| 3,753,062 | 8/1973 | Grenwell | 318/810 |
| 4,091,294 | 5/1978 | Zankl et al. | 318/808 |
| 4,117,364 | 9/1978 | Baker | 318/810 |
| 4,207,510 | 6/1980 | Woodbury | 318/802 |
| 4,290,108 | 9/1981 | Woehrle et al. | 318/810 |
| 4,316,132 | 2/1982 | Geppert | 318/723 |
| 4,348,627 | 9/1982 | Fulton | 318/807 |
| 4,368,411 | 1/1983 | Kidd | 318/254 |
| 4,450,398 | 5/1984 | Bose | 318/803 |
| 4,458,194 | 7/1984 | Geppert et al. | 318/811 |
| 4,467,262 | 8/1984 | Curtiss | 318/811 |
| 4,470,001 | 9/1984 | Resch et al. | 318/810 |
| 4,544,868 | 10/1985 | Murty | 318/254 |

OTHER PUBLICATIONS

"A ROM-Digital Approach to PWM-Type Speed Control of AC Motors," Motorola Application Note AN-733, 1974.

Primary Examiner—David Smith, Jr.
Attorney, Agent, or Firm—Wolf, Greenfield & Sacks

[57] ABSTRACT

An induction motor system, including a housing, a stator supported by the housing and having a plurality of stator winding conductors positioned about an axis of rotation, and a rotor mounted in the housing for rotation about the axis of rotation, is provided with an integral electronic controller for dynamically and programmably controlling the currents supplied to individual conductors of the stator winding. The stator winding conductors are connected in common at one end and are individually connected to a switching circuit at the other end. The switching circuit supplies positive or negative current pulses through selected conductors. Pulse width modulated signals generated by the controller simulate sine wave energizing signals to provide various operating configurations. By programmed variation of the fundamental frequency, pole configuration, phasing and power level, the rotating speed, starting, acceleration, torque, reversing, dynamic braking and efficiency are dynamically controlled.

33 Claims, 5 Drawing Sheets

POLYPHASE INDUCTION MOTOR SYSTEM AND OPERATING METHOD

FIELD OF THE INVENTION

This invention relates to electric motors and, more particularly, to a polyphase induction motor system with an integral electronic controller which dynamically varies the operating characteristics of the motor to provide desired startup, acceleration, operating speed and efficiency.

BACKGROUND OF THE INVENTION

Three phase motors are widely used for industrial service because three phase power can be generated and distributed more economically in large quantities than single phase power. A three phase induction motor includes a stator containing a stator winding and a rotor containing a rotor winding. The operation of three phase induction motors depends on a rotating magnetic field in the air gap between the stator, or stationary part, and the rotor, or rotating part, of the motor. The rotating magnetic field causes rotation of the rotor at nearly the frequency of the power source. The rotor of a so-called squirrel cage motor has a laminated iron core with slots on its periphery. Uninsulated conductors are imbedded in the slots of the cylindrical rotor core and are connected to each other at each end of the rotor. The squirrel cage motor is the most widely used motor of any type because of its rugged simplicity and low cost. It is used to drive such loads as fans, blowers, machines, centrifugal pumps and motor-generator sets. A polyphase induction motor is simple in the sense that the rotor is the only moving part and electrical connections to the rotor are not required. In addition, polyphase induction motors operate with high efficiency at, or near, full load.

Because most homes and rural areas are provided only with single phase power, polyphase induction motors are not used in home appliances. In addition, polyphase induction motors have two major disadvantages. When lightly loaded, they have much lower efficiencies than when fully loaded. Furthermore, the motor speed is determined by the power source frequency and the number of poles in the stator winding, thereby making variable speed operation difficult. Variable speed operation of induction motors has been achieved by a number of techniques. Multiple windings provide a number of pole configurations and a number of discrete operating speeds. The voltage of the stator supply can be varied to provide some speed variation. However, efficiency is reduced at low speeds. The frequency of the stator supply can be varied. However, this results in a substantial increase in cost, since a variable frequency supply of even moderate output power is expensive. Wound rotor induction motors with slip rings permit speed to be varied by varying the rotor resistance, and slip control techniques have been utilized. Any of these techniques add to the cost of the motor substantially and are often limited in effectiveness.

Polyphase induction motors were invented by Nikola Tesla a hundred years ago and, by now, represent a mature technology. Modern motors are virtually unchanged except for design improvements.

It is a general object of the present invention to provide a novel polyphase induction motor system.

It is another object of the present invention to provide an induction motor system incorporating a real-time computer to control and switch system parameters.

It is another object of the present invention to provide a new and improved induction motor system using a real-time microcomputer to dynamically and programmably switch components of the stator winding.

It is another object of the present invention to provide an inexpensive and controllable source of mechanical power from an electric power source.

It is another object of the present invention to provide an induction motor system including an integral microprocessor for control of operating characteristics.

It is another object of the present invention to provide an induction motor system with variable speed obtained by computer control of the stator winding configuration, the stator supply frequency and the number of phases in the stator power supply.

It is another object of the present invention to provide an induction motor system having dynamically controlled starting regimes without elaborate switchgear or special rotor windings.

It is another object of the present invention to provide an induction motor system having controlled acceleration to a preselected speed without drawing excessive starting current.

It is another object of the present invention to provide an induction motor system wherein the motor may be instantaneously tuned to the load by selectively energizing only part of the stator winding.

It is another object of the present invention to provide an induction motor system in which undesirable effects due to harmonics and other causes are minimized by supplying each conductor with in-phase energy whose power distribution is such as to suppress or eliminate said undesirable harmonics.

It is another object of the present invention to provide an induction motor system with smooth dynamic braking by progressively diminishing the rotary speed of the stator magnetic field so that the rotor overruns it.

It is another object of the present invention to provide an induction motor system in which the speed, torque and power output can, jointly or individually, be dynamically altered according to one or more protocols programmed into the integral controller.

It is another object of the present invention to provide an induction motor system in which the speed, torque and power output can, jointly or individually, be dynamically altered by an external control system or computer interfaced to and interacting with programs embodied in the integral motor control circuitry.

It is another object of the present invention to provide a variable speed polyphase induction motor system which can operate from a single phase supply with the efficiency of a polyphase motor matched to its optimum load.

It is another object of the present invention to provide an induction motor system that will run smoothly at all operating speeds, accelerating or decelerating smoothly when the speed needs changing.

It is another object of the present invention to provide an induction motor system having simultaneous high efficiency, variable speed and easy starting characteristics.

SUMMARY OF THE INVENTION

According to the present invention, these and other objects and advantages are achieved in an induction motor system comprising a housing, a stator supported by the housing and including a plurality of stator winding elements positioned about an axis of rotation, a rotor mounted in the housing for rotation about the axis of rotation, means for supplying electrical energy to the motor system, and means for dynamically controlling currents supplied to individual elements of the stator winding such that the rotor is caused to rotate with predetermined characteristics. The elements of the stator winding extend axially along the periphery of a generally cylindrical opening in the stator, for magnetic interaction with the rotor.

The dynamic control means can vary the operating speed of the motor by varying the number of magnetic poles and by varying the fundamental frequency component of the individual currents in the elements of the stator winding. In addition, the control means can vary the number of phases in the fundamental frequency component of the stator winding currents and can vary the power supplied to the motor and the torque by energizing more or fewer stator winding elements.

The dynamic control means can include switching means for individually supplying current through each element of said stator winding in one direction or the opposite direction, memory means for storing a predetermined switching sequence for each element of said stator winding to give a desired operating characteristic, and processor means for sequencing through the switching sequence stored in said memory means and energizing said switching means in accordance with said stored sequence. The elements of the stator winding are typically energized by pulse width modulated currents, pulse amplitude modulation or other means. Since the stator winding elements are energized in parallel, relatively low voltages can be utilized. The high efficiency and low voltage makes the motor system ideal for battery powered operation. The system can include means for sensing the motor operation and providing inputs to the processor means for adjusting the operation to provide instantaneously or programmably alterable characteristics. The system can further include means for externally or internally presetting or overriding the operation of the motor system to have predetermined operating characteristics.

BRIEF DESCRIPTION OF THE DRAWINGS

For a better understanding of the present invention together with other and further objects, advantages and capabilities thereof, reference may be had to the accompanying drawings which are incorporated herein by reference and in which.

DETAILED DESCRIPTION OF THE INVENTION

In accordance with the present invention, there is provided an induction motor system having an electronic controller for individually controlling the conductors which comprise the stator winding. The motor system includes a polyphase induction motor which is similar to conventional polyphase induction motors in respect to the motor housing except that space is provided for the electronic controller. The stator can be the same as conventional motors, except for windings modified as described below. A squirrel cage rotor is identical to those used in prior art induction motors. The present invention can also utilize a conventional wound rotor or, for synchronous operation, a rotor in which the windings are controlled by the same method as said stator windings. The motor of the present invention differs from prior art polyphase induction motors in that a novel stator winding configuration is effectively utilized in conjunction with a novel electronic controller for supplying energizing current to stator windings.

Figure 1:
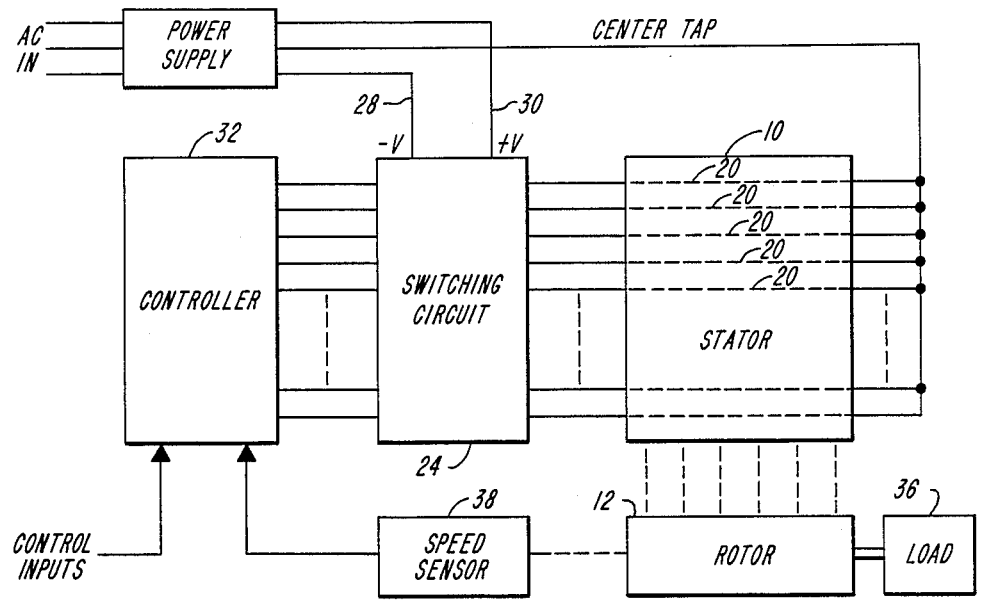
FIG. 1 is a simplified block diagram of an induction motor system in accordance with the present invention.
Figure 2A:
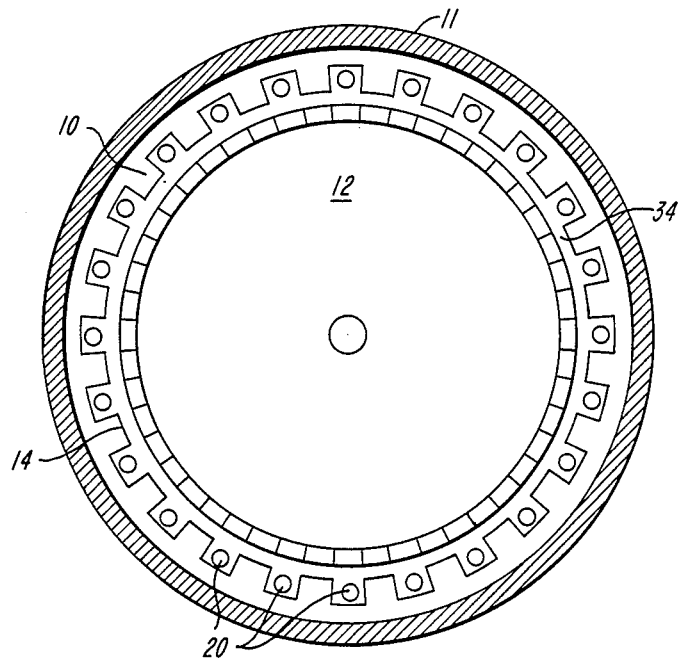
FIGS. 2A–2D are simplified axial and cross-sectional views of an induction motor in accordance with the present invention.
Figure 2D:
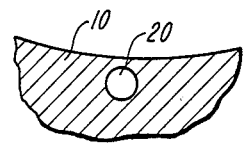
Figure 2C:
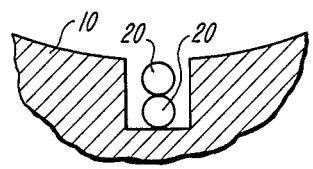
Figure 2B:
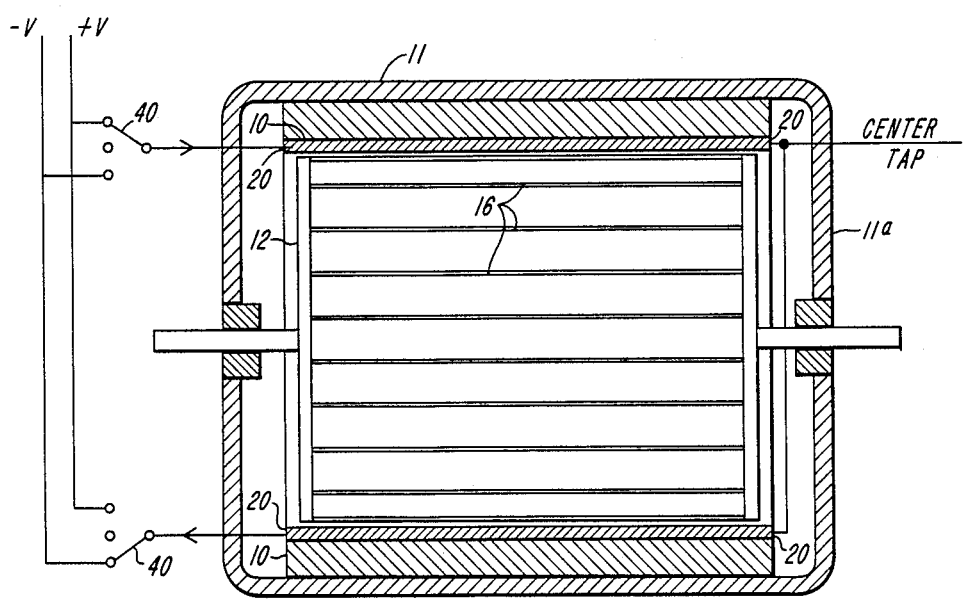

A block diagram of an induction motor system in accordance with the present invention is shown in FIG. 1. A simplified mechanical configuration of the motor is shown in FIGS. 2A and 2B. The induction motor includes a laminated stator 10 supported by a housing 11 and a rotor 12 supported by bearings in the housing end bells 11a for rotation within a generally cylindrical opening 14 in the stator 10. The stator 10 is comprised of a plurality of conductors 20, as best seen in FIG. 2A, positioned in axial slots in the laminations of the stator 10. Each slot in the stator 10 can include two or more conductors 20 as shown in FIG. 2C. Furthermore, the conductors 20 can be imbedded in closed stator slots as illustrated in FIG. 2D. The rotor 12 includes a plurality of axial rotor windings 16 connected together at their ends. The motor is constructed in accordance with prior art techniques except for the unique electrical connections to the stator conductors 20 as described hereinafter.

Normally the conductors of a stator are connected in a fixed configuration to provide a predetermined pole configuration which governs the speed according to the equation $s = 120 f/p$ where f is the supply frequency and p is the number of poles. For example, the motor may have a two-pole or four-pole configuration. In accordance with the present invention, however, the conductors 20 are individually connected at one end to a stator winding switching circuit 24, and at the opposite end are connected together in common to the center-tapped ground terminal of a power supply 26.

The switching circuit 24 receives power on leads 28 and 30 from the power supply 26 and supplies power to the conductors 20 in a dynamically programmable fashion as described hereinafter. The switching circuit 24 is controlled by a programmable controller 32 which, in a preferred embodiment, is a microcomputer and associated memory unit and interface circuitry. The programmable controller 32 provides the necessary control signals to energize selected conductors 20 in the stator 10 with currents in one direction or the opposite direction. The currents through each of the conductors 20 are changed dynamically as a function of time in accordance with the controller 32 outputs. As a result, the stator produces a rotating magnetic field in a gap 34 between the stator 10 and the rotor 12 which causes the rotor to rotate at a predetermined speed and drive a load 36.

The rotation of the rotor 12 can be sensed by an optional speed sensor 38, the output of which is connected to the programmable controller 32. In addition, optional inputs can be supplied to the programmable controller 32 from an external source, such as manual switches or an external control system, for determining the speed, acceleration and other operating characteristics of the motor.

In a preferred embodiment of the present invention, the controller 32 comprises a microprocessor, such as a type 6502, RAM for temporary storage, ROM for storage of operating routines and tables, and interface circuitry. The power supply 26 can be a center-tapped supply of simple design which converts single phase a.c. to positive and negative d.c. Very little regulation is required.

The mode of energizing the conductors is illustrated in simplified form in FIG. 2B. One end of each conductor 20 in the stator windings is connected in common to a reference potential such as the center tap of the d.c. power supply. The opposite end of each conductor 20 is connected to a switch 40 having three possible states. In one state the conductor is connected to a positive voltage +V so as to cause positive current pulses to flow through the conductor 20. In a second position, the conductor is connected to a negative voltage −V so as to cause negative current pulses to flow through the conductor 20. In a third position, the conductor 20 is open-circuited and no current pulses flow. As a result, each individual conductor 20 of the stator winding can be programmed for positive or negative current pulses or no current pulses, resulting in an overall dynamic programming of motor operation. The programming of stator conductor currents simulates particular operating modes of the motor. Thus, the conductors 20 are energized to form coils which create magnetic fields which rotate in the air gap 34 and cause rotation of the rotor 12. It will be understood that by appropriate programming of the currents energizing the conductors 20, various modes of operation can be obtained.

By opening and closing the switches in accordance with known pulse width modulation techniques to supply pulse width modulated energizing currents, magnetic fields equivalent to those produced by a sine wave energizing signal can be obtained. The frequency of the equivalent sine wave, hereinafter referred to as the fundamental frequency component, determines the speed of rotation of the motor. Thus, for any given stator pole configuration, further speed variations are obtained by variations of the fundamental frequency component. Furthermore, the number of magnetic poles in the motor can be varied by changing the relative phasing of the fundamental frequency components applied to each of the conductors 20. By changing the effective number of poles in the stator, the frequency of rotation is changed in discrete steps. The combination of pole configurations and variable fundamental frequency allows for wide variation of motor speed, under programmed control. In another application, more or fewer of the conductors 20 can be energized, depending on the motor load, thereby improving efficiency and reducing starting current demands. In some motors, each stator slot contains two or more conductors. These conductors can be energized separately using the arrangement shown in FIG. 2B with different currents to produce additional control over the operation of the motor. In another mode of operation, fundamental frequency variation and pole number changes can be used to slow down and reverse the direction of motor rotation and to provide dynamic braking. The technique of fundamental frequency variation and pole number variation can also be used to provide smooth starting characteristics with excellent speed regulation, even at slow speeds.

Figure 3:
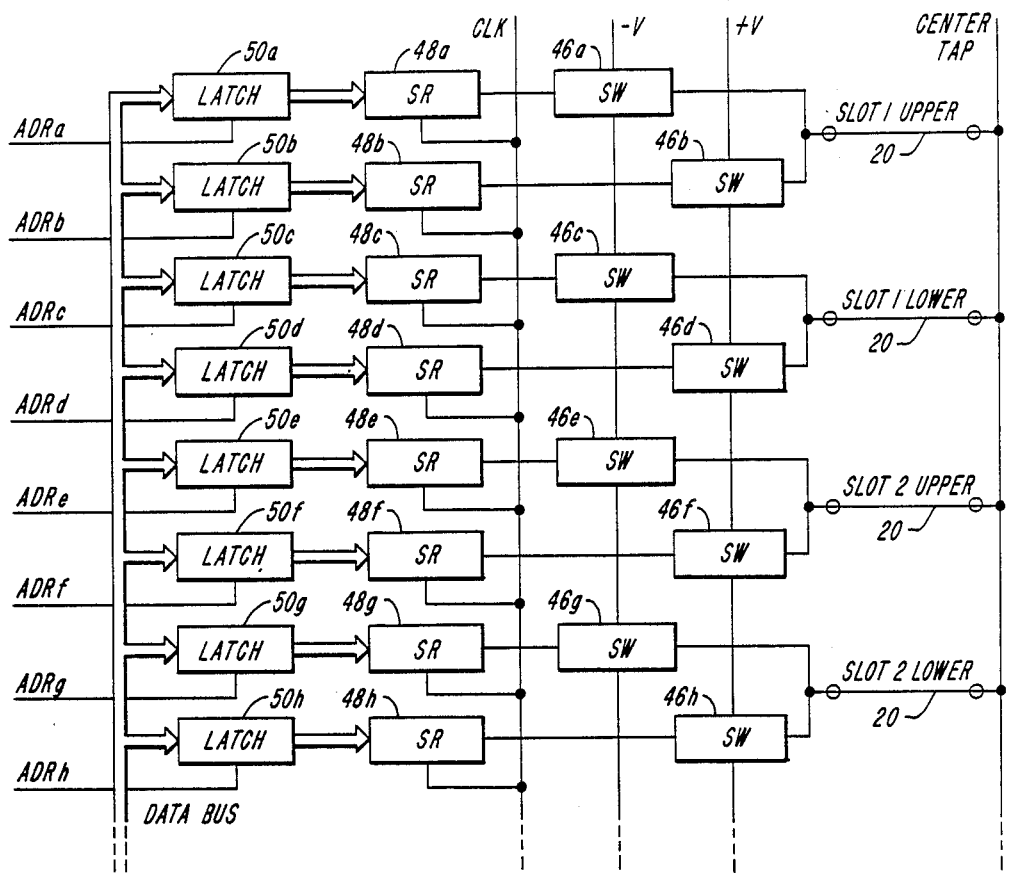
FIG. 3 is a diagram of the switching circuit shown in FIG. 1.

A detailed example of one version of an operational switching circuit 24 is shown partially in FIG. 3. The conductors 20 are connected at one end in common to the center tap terminal of the power supply 26. In the example shown, each slot in the stator has one upper conductor and a lower conductor although more conductors may be supplied if the economics of the solid state switching circuitry so warrant. The circuitry shown is representative of the circuitry for each slot and is repeated for each conductor in each slot in the stator. Electronic switches 44 connect a particular conductor 20 to the positive voltage +V, while the electronic switches 46 connect a particular conductor 20 to the negative voltage −V. It will be understood that for each conductor 20 either of the switches 44, 46 can be on or both switches 44, 46 can be off. However, the integral controller will insure that both switches connected to a conductor 20 cannot be on simultaneously. The switches 44, 46 can be any convenient switching device such as MOSFET transistors, bipolar transistors or reed relays. A solid state device, of course, provides the advantage that arc-producing open contacts are eliminated for explosion-proof applications. In practice, for every switch 44 which is on, there is a corresponding switch 46 which is on so that the equivalent of a single turn coil is effected and hence the current supplied by the positive and negative supplies is matched and the ground current will be zero or minimal in a balanced configuration.

The switching circuit 24 further includes a plurality of shift registers 48, one for each of the switches 44, 46. The serial outputs of the shift registers 48 are connected to the switches 44, 48 and control the switch states. Each of the shift registers 48 has a clock input for transferring data out through the serial output. The shift registers 48 receive inputs in parallel format from latches 50 which store data received from the controller 32 on a data bus. If one of the shift registers contains "1"'s, the other will contain only "0"'s. A "1" strobed out from said shift register 48a or 48b turns the corresponding switch 46a or 44b on or leaves it on if it is already on; a "0" turns it off. In a typical embodiment, the latches 50 and the shift registers 48 each contain eight bits, or one byte although wider data paths can be utilized. Data is strobed into each of the latches 50 from the data bus when an addressing signal is received from the controller 32. It will be understood that the circuitry shown in FIG. 3 is but one example of suitable logic for energizing the conductors 20 in a dynamically programmable manner. The logic can be implemented with commercially available devices. In future systems, the logic can be implemented with custom LSI devices to reduce size, cost and power requirements.

As noted above, the conductors 20 can be energized by pulse width modulated digital signals which simulate sine waves in terms of the magnetic fields produced. The simulated sine waves supplied to the various conductors 20 must be shifted in phase to produce three phase excitation. In the present example, one half cycle of the sine wave is broken down into 64 intervals, each represented by an eight bit byte. A complete cycle of the sine wave is generated by 1,024 bits. Since the positive and negative half cycles of the sine wave are the same except for polarity, 512 bits and polarity can be used to represent a full cycle. The bit pattern, given in groups of eight bits, is shown in Appendix A.

Now consider the excitation of slot 1, upper conductor 20 by a full cycle of the pulse width modulated approximation to a sine wave power distribution. Initially, byte 0, shown in Appendix A, is loaded into latch 50b, shown in FIG. 3, and then transferred to shift register 48b. Byte 0 is then transferred out serially by the clock signal to switch 44b. Switch 44b energizes the upper conductor 20 of slot 1 in accordance with the bit pattern of byte 0. Switch 44b is turned on, and voltage +V is supplied to the slot 1, upper conductor 20 whenever a "1" occurs in the byte. Next, bytes 8, 16, 24, etc. are loaded sequentially into latch 50b, transferred to shift register 48b and then transferred out serially to switch 44b. The controller 32 continues sequencing through the bytes shown in Appendix A until byte 504 is reached. At this point, a half cycle is completed and a crossover to a negative half cycle is required. Now bytes 0, 8, 16, 24, etc. are transferred into latch 50a, and then into shift register 48a, and transferred out serially to energize switch 46a. Switch 46a energizes the upper conductor 20 of slot 1 in accordance with the bit pattern of byte 0 by connecting voltage −V thereto whenever a "1" occurs in the byte. The remaining bytes starting at addresses 8, 16, 24 are supplied through switch 46a in the same manner. In this way, a negative half cycle of the sine wave is produced in slot 1, upper conductor 20.

During the time that the 8 bit pattern is being shifted out of one of the shift registers 48, the next byte is being transferred into the associated latch 50 by the controller 32. The controller insures that only one of each pair of shift registers associated with a particular conductor 20 contains "1"'s during an interval, while the other shift register is held reset. This insures that only one of the voltages +V, −V is connected to a conductor 20 at a particular time. As the bits are shifted out of the shift register 48, the corresponding switch is turned on or off in accordance with the data in the shift register. The shift register is clocked with 1,028 pulses to complete a cycle of the fundamental sine wave.

The switching circuit 24 is the means whereby the stator winding is programmed to a given configuration. For each specific configuration, each conductor 20 is paired with one which represents the other side of a coil for producing magnetic fields in the gap 34. Since one end of each conductor 20 is grounded, the two conductors comprising a coil are energized with pulses that are the same, but of opposite polarity so that equal and opposite currents flow and a coil, which corresponds to an actual single turn coil in a conventional motor, is formed. Depending on the data supplied to each of the switches 44, 46 for energizing the conductors 20, the configuration of the stator winding is programmable.

In producing three phase excitation of the stator conductors 20 by pulse width modulation, it is necessary to start the various phases at different points in the data stream defined in Appendix A. If the three phases are designated A, B and C, phase A is started at byte 0 in Appendix A, phase B is started at bit 172 (in byte 168) with positive polarity, and phase C is started at bit 172 with negative polarity. Another important parameter in the operation of the present invention is the cross-over point of the fundamental component of the sine wave; that is, the point during the data stream at which the polarity of the voltage connected to conductor 20 must be switched from positive to negative, or vice versa. For the above starting points, the cross-over points are 0 for phase A, byte 256 for phase B and byte 256 for phase C.

The present invention will now be illustrated by way of example wherein a conventional three phase, four-pole induction motor having 24 stator slots is simulated. In the example, each slot of the stator 10 is provided with an upper conductor and a lower conductor. The phase connections and the initial polarities for each conductor to produce a four-pole configuration is shown in Table 1 wherein the three phases are designated by A, B and C.

When pulse width modulated power from the supply 26 is switched to each of the upper and lower conductors in slots 1-24 by the switching circuit 24 and the controller 32 as described above, the motor operates in the same manner as if three phase, sinusoidal power were supplied to the stator windings with the phases connected as shown in Table 1. The pulse width modulated signals supplied to the upper and lower conductors in slots 1-24 must be appropriately phased to produce the same rotating magnetic fields as produced by three phase power.

Figure 4:
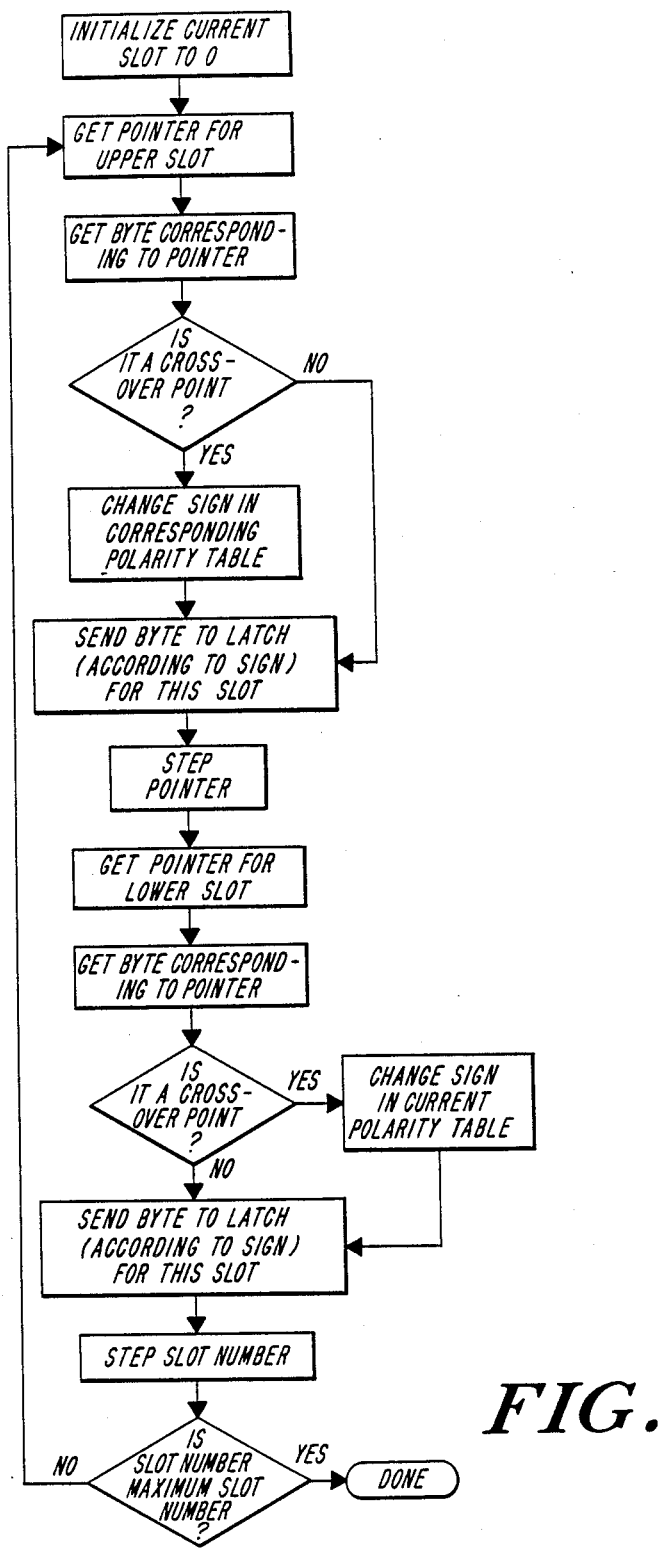
FIG. 4 is a software flow diagram for one mode of operation of the present invention.

The necessary pulse width modulated signals are generated by the controller 32 and the switching circuit 24 by means of the software subroutine illustrated in FIG. 4, which uses the bit stream shown in Appendix A and the information shown in Table 1. In addition, the subroutine requires the number of slots (24, in this case), the starting point for each phase in Appendix A (bit 0 for phase A, bit 172 positive for phase B and bit 172 negative for phase C), and the cross-over point where each phase changes polarity (bit 0 for phase A, bit 256 for phase B and bit 256 for phase C).

TABLE 1

| | Model of 4-Pole Winding | | | |
| | Upper Conductor | | Lower Conductor | |
| Slot | Phase | Initial Polarity | Phase | Initial Polarity |
| --- | --- | --- | --- | --- |
| 1 | A | + | A | + |
| 2 | A | + | C− | − |
| 3 | C− | − | C− | − |
| 4 | C− | − | B | + |
| 5 | B | + | B | + |
| 6 | B | + | A− | − |
| 7 | A− | − | A− | − |
| 8 | A− | − | C | + |
| 9 | C | + | C | + |
| 10 | C | + | B− | − |
| 11 | B− | − | B− | − |
| 12 | B− | − | A | + |
| 13 | A | + | A | + |
| 14 | A | + | C− | − |
| 15 | C− | − | C− | − |
| 16 | C− | − | B | + |
| 17 | B | + | B | + |
| 18 | B | + | A− | − |
| 19 | A− | − | A− | − |
| 20 | A− | − | C | + |
| 21 | C | + | C | + |
| 22 | C | + | B− | − |
| 23 | B− | − | B− | − |
| 24 | B− | − | A | + |

The subroutine variables are (1) a table of current polarities (twice the number of slots); (2) a table of current pointers (twice the number of slots); and (3) a current slot register which holds the present slot being processed. The routine shown in FIG. 4 takes bytes from a table in ROM memory corresponding to Appendix A, loads them into the appropriate latch 50 in the switching circuit 24 while keeping track of slot numbers, cross-over points and current status. This subroutine can be cycled continuously to produce a 4-pole configuration. If the clock rate is held constant, the speed will be constant; if the clock rate is increased or decreased, the speed will be increased or decreased in proportion. Alternatively, this subroutine can be incorporated into another routine which varies the sine wave fundamental frequency component and number of poles in the stator configuration. Such a routine is described hereinafter.

In a second example of the present invention, the motor is started and accelerated smoothly to a predetermined speed; for example, 3600 rpm. The starting and acceleration to the predetermined speed will be accomplished by configuring the motor in a first pole configuration, accelerating up to a first speed, switching the motor to a second pole configuration, accelerating to a second speed, and then switching to a third pole configuration and accelerating to the final operating speed. It is well known that the speed of operation of a polyphase induction motor is given by N equals 120f divided by p, where N is the synchronous speed in revolutions per minute, f is the frequency of the power supply in Hz and p is the number of poles produced by the stator winding.

Figure 5:
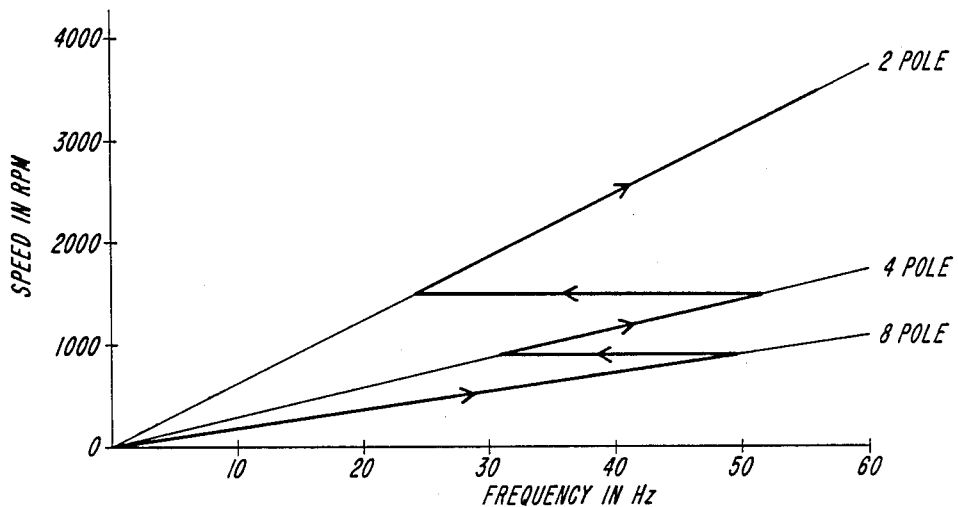
FIG. 5 is a graph plotting motor speed as a function of supply frequency for different pole configurations indicating a strategy for smoothly accelerating the motor.

The present example is illustrated in FIG. 5. In an eight-pole configuration, the frequency is increased from 20 Hz to 50 Hz. The configuration is then switched to four-pole and the frequency is increased from 30 Hz to 50 Hz. Finally, the configuration is switched to two-pole and the frequency is increased from 20 Hz to 60 Hz. As a result, the motor is smoothly and rapidly accelerated up to the synchronous speed of 3600 rpm, operating at 60 Hz.

Figure 6:
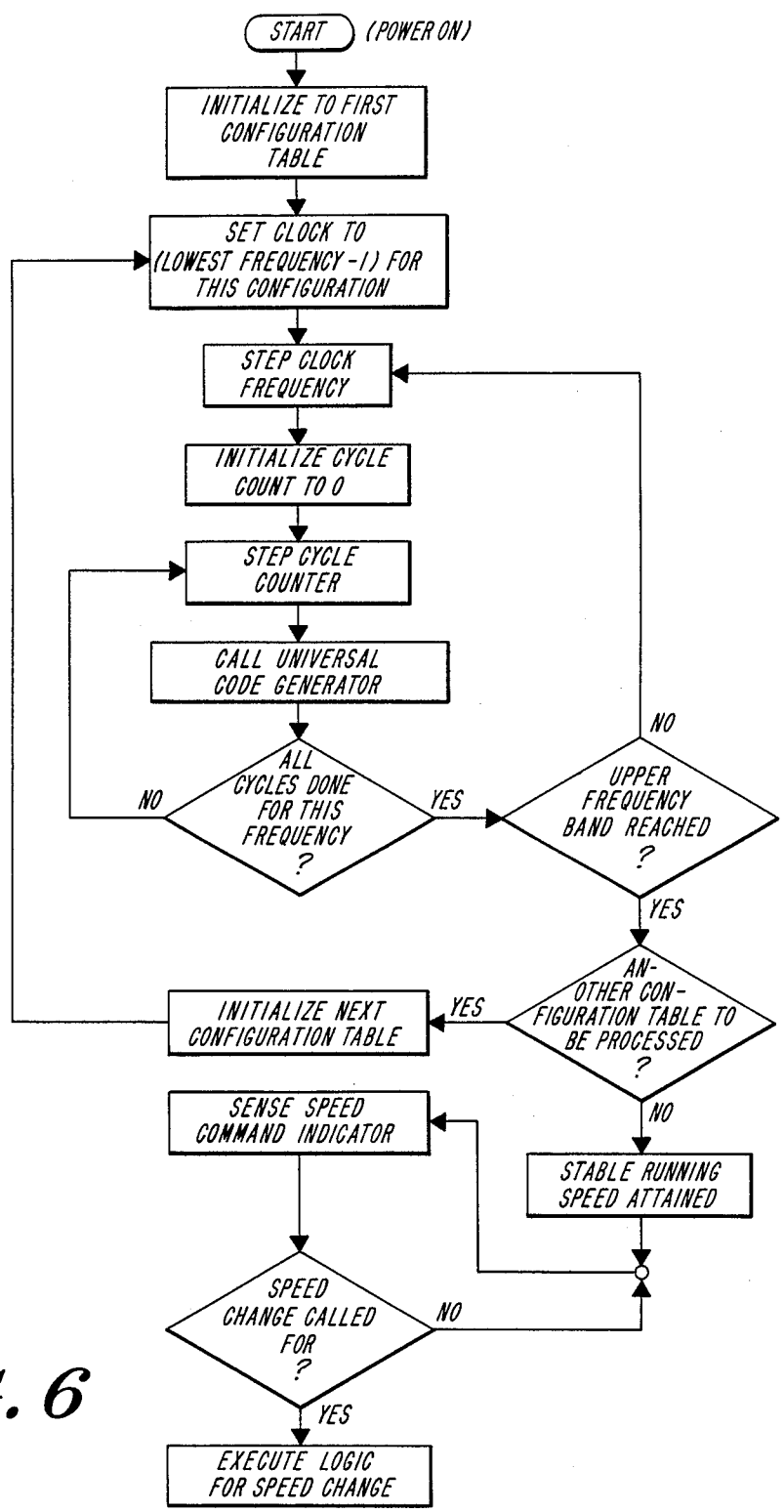
FIG. 6 is a software flow diagram for another mode of operation of the present invention.

The necessary switching for the frequency and pole variation shown in FIG. 5 is performed by the controller 32 and the switching circuit 34 in accordance with a routine in FIG. 6. The routine requires models of a two-pole configuration, a four-pole configuration and a six-pole configuration stored in memory. These models will provide the necessary phase and polarity information for each conductor 20 in the stator similar to the information contained in Table 1. The routine uses pulse width modulation techniques as described above to gradually increase the fundamental excitation frequency of the conductors 20. This is accomplished by increasing the frequency of the clock which transfers data out of the shift registers 48. When the upper frequency of a particular pole configuration is reached, new frequency and pole configuration models in memory are accessed, and the process of increasing frequency is repeated.

It can be seen that the operation of the motor is entirely programmable in terms of speed and pole configuration. In addition, when the motor is lightly loaded, various ones of the conductors 20 can be energized while others are not energized, thereby limiting the power delivered to the motor in light load conditions. Furthermore, the motor can be programmed to decrease speed and to reverse direction, if so desired, or can be programmed to increase or decrease speed while running in accordance with any desired program. The programmed starting described above can be used to reduce the starting transients which occur when full power is abruptly applied to the motor. Furthermore, regenerative braking can be accomplished by making the rotor speed overrun the rotating speed of the stator magnetic field. For battery operation, further switching is required to feed the regenerated power back to the batteries via solid state rectifiers.

It will be understood that the program for operation of the motor can be contained entirely within the controller 32; for example, in a ROM memory. Alternatively, preset inputs as shown in FIG. 1 can be utilized to set different modes of operation, depending on the desired operating conditions. For example, a pole configuration or operating speed can be set from selector switches. In addition, the motor system of the present invention can be part of a larger system and can be automatically and dynamically controlled from a remote computer or controller which supplies inputs on the preset lines. Furthermore, speed sensors 38, or other sensors of motor operation, can be utilized to control the operation of the controller 32 and the motor in a feedback arrangement. For example, the sensor 38 can be used to determine when a desired operating speed is reached. From then on, the motor is maintained at a constant operating speed.

The programmable feature of the present invention can be utilized to shift the phases of the fundamental components supplied to the stator conductors 20 so as to eliminate harmonics and phase differences which otherwise would occur in a conventional motor. In addition, the bit patterns shown in Appendix A can be tailored to reduce harmonics while maintaining a generally sinusoidal magnetic field.

An induction motor system in accordance with the present invention is particularly useful in applications where a high level of control is needed and use can be made of the programmable feature. The induction motor system is also particularly useful in applications where the inherent flexibility can eliminate or greatly simplify mechanical linkages. Finally, the present invention provides the advantages inherent in three phase motors while operating from a single phase a.c. or a d.c. supply.

A motor in accordance with the present invention can be used in a washing machine, for example, and would start emulating a 16 pole motor with a 10 Hz supply (75 rpm). After about a revolution, it would be dynamically braked and reversed, thereby providing the washing cycle. Thus, the washing cycle can be provided without gears, clutches or other mechanical linkages. During the spin cycle, the motor can gradually speed up, changing the number of poles and the supply frequency at predetermined points, as described above, to provide a smooth flow of power until the motor operates as a two-pole machine with a frequency high enough to spin the clothes dry to a greater degree than now possible.

Another potential application of the induction motor system of the present invention is in electric automobiles. Since the induction motor system of the present invention is compatible with low voltage, high current power sources, the battery pack in an electric car can be used. An electric car can be provided with an induction motor system in accordance with the present invention at each wheel with a central controller for controlling speed and torque so that mechanical clutches, differentials and gear boxes are not needed. The only moving part is the rotor of each motor. The efficiency of the polyphase induction motors under full load is typically over 90%. Great starting torque and a smooth increase in speed are achieved as described above and further economy can be achieved by dynamic braking techniques.

In refrigerators and air conditioners, the induction motor system of the present invention can be closely matched to the load so as to provide high efficiency. In another application, the present invention can be applied to linear induction motors since these operate on the same principles as rotating induction motors.

If a rotor with a similar winding and controller replaces the squirrel cage rotor, a "variable speed" synchronous machine is obtained. Such a machine can maintain a fixed speed (within very close tolerances) at any arbitrarily chosen speed, freeing it from the necessity of running at "normal" synchronous speeds (3600, 1800 rpm, etc.).

Thus, there is provided by the present invention a polyphase induction motor system in which an internal pulse width modulated polyphase supply and the individual connections of the stator conductors are controlled by an integral, real-time microcomputer system so that the winding topology, the number of poles, the supply voltage and frequency, and the number of phases can be continuously and independently manipulated to provide desirable motor characteristics. These characteristics include high efficiency at all loads, variable speeds, smooth speed variation, smooth starting and acceleration, dynamic braking, reversing, stepping, jogging, constant torque, constant speed and constant power output. The integral computer system provides a clean, simple and effective interface to external control devices. Such a system, drawing power from a single phase external power supply, can replace awkward and inefficient single phase motors while preserving the advantages of a polyphase motor system.

While there has been shown and described what is at present considered the preferred embodiments of the present invention, it will be obvious to those skilled in the art that various changes and modifications may be made therein without departing from the scope of the invention as defined by the appended claims.

APPENDIX A

| ADDRESS | | ADDRESS | |
|---|---|---|---|
| 0 | 00000000 | 256 | 11111111 |
| 8 | 00001110 | 264 | 11111111 |
| 16 | 01110000 | 272 | 11111111 |
| 24 | 10000000 | 280 | 11111111 |
| 32 | 10000011 | 288 | 11111111 |
| 40 | 10000011 | 296 | 11111111 |
| 48 | 00000111 | 309 | 11111111 |
| 56 | 00000111 | 312 | 11111111 |
| 64 | 00001111 | 320 | 11111000 |
| 72 | 00001111 | 328 | 11111111 |
| 80 | 00011111 | 336 | 11111111 |
| 88 | 00011111 | 344 | 11111111 |
| 96 | 00111111 | 352 | 11111000 |
| 104 | 11111100 | 360 | 11111111 |
| 112 | 11100011 | 368 | 11111000 |
| 120 | 00011111 | 376 | 11111111 |
| 128 | 11111111 | 384 | 11111000 |
| 136 | 00011111 | 392 | 11000111 |
| 144 | 11111111 | 400 | 00111111 |
| 152 | 00011111 | 408 | 11111100 |
| 160 | 11111111 | 416 | 11111000 |
| 168 | 11111111 | 424 | 11111000 |
| 176 | 11111111 | 432 | 11110000 |
| 184 | 00011111 | 440 | 11110000 |
| 192 | 11111111 | 448 | 11100000 |
| 200 | 11111111 | 456 | 11100000 |
| 208 | 11111111 | 464 | 11000001 |
| 216 | 11111111 | 472 | 11000001 |

APPENDIX A-continued

| ADDRESS | | ADDRESS | |
|---|---|---|---|
| 224 | 11111111 | 480 | 00000001 |
| 232 | 11111111 | 488 | 00001110 |
| 240 | 11111111 | 496 | 01110000 |
| 248 | 11111111 | 504 | 00000000 |

I claim:

1. An induction motor system comprising:
a housing;
a stator supported by said housing and including a plurality of stator conductors positioned around an axis of rotation, for producing magnetic fields when energized by an electric current, said stator conductors extending axially along the periphery of a generally cylindrical opening in said stator centered on said axis of rotation;
a rotor positioned in said cylindrical opening and including means for producing magnetic fields for magnetic interaction with said stator conductors, said rotor being mounted in said housing for rotation about said axis of rotation;
source means for supplying electrical energy to said motor system; and
means for dynamically controlling currents individually and separately supplied in parallel from said source means to said stator conductors such that said rotor is caused to rotate with predetermined characteristics, each of said stator conductors being defined as extending only once between opposite ends of said stator and being electrically connected at said opposite ends to said control means.

2. An induction motor system as defined in claim 1 wherein said control means includes means for dynamically varying the number of magnetic poles produced by said stator conductors.

3. An induction motor system as defined in claim 1 wherein said control means includes means for dynamically varying the fundamental frequency component of the currents individually supplied to said stator conductors.

4. An induction motor system as defined in claim 1 wherein said control means includes means for dynamically varying the phase relationships between the fundamental frequency component of the currents individually supplied to said stator conductors.

5. An induction motor system as defined in claim 1 wherein said control means includes means for dynamically varying the number of said stator conductors which are energized.

6. An induction motor system as defined in claim 1 wherein said control means includes means for controlling the currents individually supplied to said stator conductors so as to reverse the direction of rotation of said rotor.

7. An induction motor system as defined in claim 1 further including means for sensing the speed of rotation of said rotor, and wherein said control means includes means responsive to said sensing means for maintaining the speed of rotation of said rotor at a predetermined speed.

8. An induction motor system as defined in claim 1 wherein said control means includes:
switching means for individually supplying a selected current through each of said stator conductors, in one direction or in the opposite direction;

memory means for storing a program for controlling the states of said switching means during operation of said induction motor system; and processor means for sequencing through said program so as to dynamically control the movement of said rotor in accordance with said program.

9. An induction motor system as defined in claim 8 wherein said control means includes means for supplying to said stator conductors pulse modulated power which is individually varied for each of said stator conductors.

10. An induction motor system as defined in claim 8 further including means coupled to said processor means for preselecting a desired mode of operation of said induction motor system.

11. An induction motor system as defined in claim 1 wherein said control means includes means for reducing the power input to said stator conductors when said rotor is relatively lightly loaded.

12. An induction motor system as defined in claim 1 wherein said control means includes means for dynamically varying the currents individually supplied to said stator conductors so as to control the torque and power output of said motor system on demand.

13. An induction motor system as defined in claim 1 wherein said control means includes means for dynamically varying the currents individually supplied to said stator conductors so as to temporarily increase the torque and power output beyond the rated values for said motor system.

14. A method for energizing an induction motor comprising the steps of:

providing a stator supported by a housing and including a plurality of stator conductors positioned around an axis of rotation, and a rotor including means for producing magnetic fields for magnetic interaction with said stator conductors, each of said stator conductors being defined as extending only once between opposite ends of said stator in an axial direction parallel to said axis of rotation;

individually connecting each of said plurality of stator conductors to a source of energizing current such that each conductor is separately energized; and supplying energizing currents to said individual stator conductors in parallel such that said rotor is caused to rotate with preprogrammed characteristics.

15. A method for energizing an induction motor as defined in claim 14 wherein said step of supplying energizing currents includes the step of varying the number of magnetic poles produced by said stator conductors.

16. A method for energizing an induction motor as defined in claim 14 wherein said step of supplying energizing currents includes varying the fundamental frequency component of the time-varying currents supplied to said stator conductors such that the speed of rotation is correspondingly varied.

17. A method for energizing an induction motor as defined in claim 12 wherein said step of supplying energizing currents includes the step of varying phase relationships between the fundamental frequency component of the currents supplied to said stator conductors.

18. A method for energizing an induction motor as defined in claim 14 wherein said step of supplying energizing currents includes the step of selecting various ones of said stator conductors to be energized so as to reduce starting current.

19. A method for energizing an induction motor as defined in claim 14 wherein said step of supplying energizing currents includes the step of controlling said energizing currents so as to reverse the direction of rotation of said rotor.

20. A method for energizing an induction motor as defined in claim 14 wherein said step of supplying energizing currents includes the step of individually supplying pulse modulated power to said stator conductors.

21. A rotating machine system comprising:

a housing;

a stator supported by said housing and including a plurality of stator conductors;

a rotor positioned adjacent to said stator and including means for producing magnetic fields, said rotor having an axis of rotation and being mounted in said housing for rotation about said axis of rotation;

said stator and said rotor defining between them a gap for interaction of magnetic fields produced by said stator conductors and said rotor, said gap between said rotor and said stator being cylindrical in shape and concentric with said axis of rotation, and said stator conductors being shaped around said gap, each of said stator conductors being defined as extending only once between opposite ends of said stator parallel to said axis of rotation;

controller means for individually supplying energizing currents to each of said stator conductors, said energizing currents collectively producing in said gap rotating magnetic fields which cause rotation of said rotor; and connection means for connecting said stator conductors electrically in parallel to said controller means such that each stator conductor is separately supplied with an appropriate energizing current and is not connected in series with other stator conductors.

22. A rotating machine system as defined in claim 21 wherein said controller means includes means for dynamically varying the energizing current individually supplied to said stator conductors.

23. A rotating machine system as defined in claim 22 wherein said controller means includes means for dynamically varying the energizing current individually supplied to said stator conductors so that the effective number of magnetic poles in the rotating magnetic fields in said gap is dynamically variable.

24. A rotating machine system as defined in claim 22 wherein said controller means includes means for dynamically varying the energizing currents individually supplied to said stator conductors so that the effective fundamental frequency of the rotating magnetic fields in said gap is dynamically variable.

25. A rotating machine system as defined in claim 22 wherein said controller means includes means for dynamically varying the number of said stator conductors which are individually supplied with energizing currents.

26. A rotating machine system as defined in claim 22 wherein said controller means includes means for dynamically varying the phase relationships between the energizing currents individually supplied to said stator conductors.

27. A rotating machine system as defined in claim 21 wherein said controller means includes source means for supplying electrical energy to said stator conductors and switching means for controlling the energizing current supplied from said source means through selected ones of said stator conductors in one direction or in the opposite direction.

28. A rotating machine system as defined in claim 27 wherein said controller means further includes memory means for storing a program for controlling the states of said switching means during operation of said rotating machine system and processor means for sequencing through said program so as to control the rotating magnetic fields in said gap in accordance with said program.

29. A rotating machine system as defined in claim 28 wherein said controller means includes means for supplying energizing currents of equal amplitude and opposite polarity to selected pairs of said stator conductors.

30. A rotating machien system as defined in claim 29 wherein said controller means includes means for individually supplying pulse width modulated energizing current to said stator conductors.

31. A rotating machine system as defined in claim 21 wherein said connection means includes a separate electrical conductor between one end of each stator conductor and said controller means and a common connection between the other end of each stator conductor and a common reference point, said stator conductors thereby being electrically connected in parallel to said controller means.

32. An induction motor system comprising:
a housing;
a stator supported by said housing and including a plurality of stator conductors positioned around an axis of rotation, for producing magnetic fields when energized by an electric current, said stator conductors extending axially along the periphery of a generally cylindrical opening in said stator centered on said axis of rotation;
a rotor positioned in said cylindrical opening and including means for producing magnetic fields for magnetic interaction with said stator conductors, said rotor being mounted in said housing for rotation about said axis of rotation;
source means for supplying electrical energy to said motor system; and
means for dynamically controlling currents individually and separately supplied in parallel from said source means to said stator conductors such that said rotor is caused to rotate with predetermined characteristics, each of said stator conductors being defined as extending only once between opposite ends of said stator and being electrically connected at said opposite ends to said control means, said control means including
switching means for individually supplying a selected current through each of said stator conductors, in one direction or in the oppsite direction;
memory means for storing a program for controlling the states of said switching means during operation of said induction motor system; and
processor means for sequencing through said program so as to dynamically control the movement of said rotor in accordance with said program.

33. An induction motor system comprising:
a stationary element including a plurality of parallel stationary element conductors for producing magnetic fields;
a movable element positioned adjacent to said stationary element and including means for producing magnetic fields, said stationary element and said movable element defining between them a gap for interaction of said magnetic fields;
controller means for individually supplying energizing currents to each of said conductors, said energizing currents collectively producing in said gap magnetic fields which cause movement of said movable element in a prescribed direction;
each of said conductors being defined as extending only once across said stationary element in a direction perpendicular to said prescribed direction of movement; and
connection means for connecting said conductors; electrically in parallel to said controller means such that each conductor is separately supplied with an energizing current and is not connected in series with other conductors.

* * * * *